(12) United States Patent
Canfield et al.

(10) Patent No.: US 11,834,112 B2
(45) Date of Patent: Dec. 5, 2023

(54) TRACKED CLIMBING MACHINE WITH COMPLIANT SUSPENSION APPARATUS

(71) Applicant: TENNESSEE TECHNOLOGICAL UNIVERSITY, Cookeville, TN (US)

(72) Inventors: Stephen Lee Canfield, Cookeville, TN (US); James Walter Beard, Cookeville, TN (US)

(73) Assignee: Tennessee Technological University, Cookeville, TN (US)

( * ) Notice: Subject to any disclaimer, the term of this patent is extended or adjusted under 35 U.S.C. 154(b) by 17 days.

(21) Appl. No.: 17/656,805

(22) Filed: Mar. 28, 2022

(65) Prior Publication Data

US 2022/0212733 A1 Jul. 7, 2022

Related U.S. Application Data

(63) Continuation of application No. 16/358,551, filed on Mar. 19, 2019, now Pat. No. 11,286,012, which is a continuation of application No. 14/061,369, filed on Oct. 23, 2013, now Pat. No. 10,232,896, which is a continuation of application No. 12/657,962, filed on Jan. 29, 2010, now Pat. No. 8,567,536.

(51) Int. Cl.
| | |
|---|---|
| *B62D 55/065* | (2006.01) |
| *B62D 55/10* | (2006.01) |
| *B62D 55/265* | (2006.01) |
| *B62D 55/30* | (2006.01) |
| *B62D 55/075* | (2006.01) |
| *B62D 55/20* | (2006.01) |

(52) U.S. Cl.
CPC ......... *B62D 55/065* (2013.01); *B62D 55/075* (2013.01); *B62D 55/10* (2013.01); *B62D 55/20* (2013.01); *B62D 55/265* (2013.01); *B62D 55/30* (2013.01)

(58) Field of Classification Search
CPC .... B62D 55/065; B62D 55/075; B62D 55/10; B62D 55/20; B62D 55/265; B62D 55/30
See application file for complete search history.

(56) References Cited

U.S. PATENT DOCUMENTS

| | | | | |
|---|---|---|---|---|
| 3,701,394 A | * | 10/1972 | Hendrickson | .......... B62M 27/02 180/9.54 |
| 4,789,037 A | | 12/1988 | Kneebone | |
| 4,828,059 A | * | 5/1989 | Naito | ................... B62D 55/265 305/164 |
| 5,435,405 A | | 7/1995 | Schempf et al. | |

(Continued)

FOREIGN PATENT DOCUMENTS

DE 69719635 T2 * 3/2004

*Primary Examiner* — Jacob D Knutson
(74) *Attorney, Agent, or Firm* — André J. Bahou; Bradley Arant Boult Cummings LLP

(57) ABSTRACT

A tracked climbing vehicle containing a compliant suspension apparatus to prescribe the distribution of forces on the adhering members in the tracked climbing machine. The compliant suspension apparatus is configured to negotiate irregularities in a climbing surface without the vehicle tracks losing full surface contact and adhesion by distributing the loads from the climbing machine chassis to the adhering traction members in a specific prescribed fashion. The apparatus thus avoids exceeding the allowable force in any adhering traction member and significantly improves the performance of the climbing machine.

19 Claims, 10 Drawing Sheets

(56) References Cited

U.S. PATENT DOCUMENTS

| | | | |
|---|---|---|---|
| 5,487,440 A | | 1/1996 | Seemann |
| 5,697,463 A | | 12/1997 | Schlegl |
| 5,884,642 A | | 3/1999 | Broadbent |
| 5,894,901 A | * | 4/1999 | Awamura ............. B62D 55/265 |
| | | | 180/6.7 |
| 6,672,413 B2 | | 1/2004 | Moore et al. |
| 7,597,161 B2 | | 10/2009 | Brazier |
| 8,567,536 B1 | | 10/2013 | Canfield et al. |
| 10,232,896 B2 | | 3/2019 | Canfield et al. |

\* cited by examiner

TRACKED CLIMBING MACHINE WITH COMPLIANT SUSPENSION APPARATUS

CROSS-REFERENCES TO RELATED APPLICATIONS

This application is a continuation of U.S. patent application Ser. No. 16/358,551, filed on Mar. 19, 2019, entitled "TRACKED CLIMBING MACHINE WITH COMPLIANT SUSPENSION APPARATUS," and which issued as U.S. Pat. No. 11,286,012 on Mar. 29, 2022; which is a continuation of U.S. patent application Ser. No. 14/061,369, filed on Oct. 23, 2013, entitled "TRACKED CLIMBING MACHINE WITH COMPLIANT SUSPENSION APPARATUS," and which issued as U.S. Pat. No. 10,232,896 on Mar. 19, 2019; which is a continuation of U.S. patent application Ser. No. 12/657,962, filed on Jan. 29, 2010, entitled "TRACKED CLIMBING MACHINE WITH COMPLIANT SUSPENSION APPARATUS," and which issued as U.S. Pat. No. 8,567,536 on Oct. 29, 2013; all of which are hereby incorporated by reference in their entireties.

FIELD OF INVENTION

This invention relates to a robotic tracked vehicle. More specifically, this invention relates to a robotic tracked vehicle for climbing with endless tracks.

BACKGROUND OF THE INVENTION

Self-propelled climbing machines or vehicles may be employed to perform remote operations in locations that are difficult for, or incompatible with, human presence or access. One example is a vehicle that can travel over a steel surface in a vertical, horizontal or upside-down configuration, such as on tanks, pipes, boiler walls or ship hulls, and also carry equipment to perform manufacture, maintenance or inspection functions. There are many structures which require maintenance, repair, inspection or manufacturing operations that could be performed by a remote machine in a tele-operated or autonomous fashion.

Numerous vehicles have been proposed to travel over inclined surfaces, and even operate upside down. These vehicles generally employ legs, wheels, or endless tracks. Vehicles using endless tracks provide several advantages, in particular the potential for a large area of contact between the vehicle and contact surface. Endless tracks provide exceptional potential for large-area surface contact between the track members (for example magnets) and the climbing surface.

This invention concerns vehicles of the endless track type with magnetic track members incorporated in the endless tracks. These vehicles are intended to operate on significant inclines, or upside down and/or on surfaces having, alone or in combination, concave, convex or irregular contours.

The endless track type climbing vehicles available in previous technologies may have adhering track members attached to the tracks and employ an endless track of specific properties, to include very high tensile stiffness of the endless track itself, in the axial direction of the track, but negligible stiffness in all transverse directions and negligible stiffness with respect to in bending. This creates a technological disadvantage in that the track in such cases is capable of supporting tensile forces, but has only minimal stiffness in bending or in tension for small angles. Accordingly, it can support only negligible loads in any other direction, cannot support sheer side loads, and cannot support compressive loads.

For such a climbing vehicle to remain in equilibrium in any given position and orientation on a climbing surface, forces affecting that equilibrium must be transferred from the climbing surface to the vehicle. For a simple track type climbing vehicle, these forces are transferred from the track members to the vehicle chassis through tensions in the endless track. This would, ideally, allow the endless track to accommodate irregular climbing surfaces but would concurrently result in localizing on the outer adhering track members all of, or a majority of, the forces necessary to affect and maintain positional and orientational equilibrium with the climbing surface.

The surface normal forces are a subset of the total forces that are required to maintain vehicle equilibrium on the climbing surface. The surface normal forces are perpendicular to the climbing surface and are required for equilibrium. To distribute this subset of forces in a manner intended to maintain equilibrium between the climbing vehicle and the climbing surface, one might envision employment of a rigid guide section that slidably connects to the endless track. However, this approach creates its own set of disadvantages in that it causes the surface normal forces to be localized on individual adhering track members whenever and wherever climbing surface irregularities are encountered.

The performance of an endless track type climbing vehicle depends directly on the effective ability of the track, and accordingly, the track members, to adhere to the climbing surface. Numerous patents exist for climbing vehicles containing endless tracks with adhering track members incorporated into the tracks. One shortcoming of these previous technologies is their universal lack of a means to distribute the load among these adhering track members in a manner that can accommodate a wide variety of surface geometrics. Creation of such a load distribution means would significantly improve the performance of these climbing vehicles, and is, therefore, a desirable advancement in the art. As is detailed below, previous technologies do not provide effective means to distribute the load among a plurality of adhering track members.

The following discussion details and contrasts the instant art with illustrative examples of previous technologies and their associated shortcomings that the instant art overcomes.

U.S. Pat. No. 5,894,901, by Awamura, incorporated herein by specific reference for all purposes, presents a traditional suspension system consisting of a plurality of press wheels equipped with elastic members (springs). These are capable of providing adjustment to the adhering members directed in to the climbing surface only. The device provides, in contrast to the instant art, no means to compensate for, or to integrate, any other forces or balance adjustments. Although, as does the instant art, the Awamura device includes magnets, an endless track, and a suspension system, as designed, it only makes provision to adjustments necessary to push the magnets into contact with the climbing surface. The device is equipped with auxiliary wheels, each wheel having a suspension supported by the vehicle body pressing the wheel against the endless track. These wheels are each supported by an elastic member in communication with the vehicle chassis. This is in contrast to the instant applicant's use of a compliant beam guide and support which automatically adjusts to balance the load carried and to maximize traction.

U.S. Pat. No. 5,435,405 by Schempf, et al., incorporated herein by specific reference for all purposes, teaches a reconfigurable mobile robot with magnetic tracks. In contrast to the instant art, which uses permanently active magnets in the tracks, Schempf teaches a magnetic system that can be activated and deactivated in the propulsion tracks. In further contrast, no guide, rigid or otherwise, is mentioned with respect to the endless track. Finally, unlike the instant art, the track appears to have no track guide.

U.S. Pat. No. 4,789,037 by Kneebone, incorporated herein by specific reference for all purposes, uses two or more endless tracks with plurality of permanent magnetic adhering track members. Each adhering track member comprises a permanent magnet sandwiched between magnetic metal plates. The magnet does not, itself, contact the climbing surface, but contacts only these metal plates. As taught, it does allow pivotal rocking motion of track assemblies relative to the vehicle body for negotiating uneven or curved surfaces, the track assemblies comprising, for each track unit, two laterally spaced chains, each forming an endless member. The device also uses a pump in the center of the body to apply additional upward or downward pressure to press the tracks onto the climbing surface. Kneebone also teaches a fan to create suction force normal to the climbing surface. But the patent mentions no sort of track guide, rigid or otherwise.

U.S. Pat. No. 5,884,642 by Broadbent, incorporated herein by specific reference for all purposes, teaches endless tracks with a plurality of magnetic sections, each tread using four rare earth magnetic segments, and adjacent treads being oriented in opposing polarities. It does not, however, discuss any type of guide for the tracks nor automatic balance control or adjustment.

U.S. Pat. No. 4,828,059 by Naito, et al., incorporated herein by specific reference for all purposes, employs a track guide that is used only to engage and disengage track magnets from climbing surfaces. Locations of loads carried by the Naito device are limited to remaining within the upper and lower planes of the endless propulsion tracks. It employs a plurality of permanent magnets on outer surface of crawler tracks and has a guidance device on crawler tracks for restraining the releasing crawler track from moving relative to crawler body in direction normal to traveling plane of magnets. It also includes a track control mechanism so designed such that the guidance device can restrain or release motion of the track to the main body in a direction normal to the surface. When this guide load is released, the load is essentially transferred in its entirety to only the end magnets of the tracks.

U.S. Pat. No. 5,487,440 by Seemann, incorporated herein by specific reference for all purposes, presents a rigid guide and a pair of parallel, endless tracks equipped with suction cup feet. These tracks slide along a grooved structure that allows for communication between a vacuum pump and those suction cups which are positioned for contact with the climbing surface. It makes little or no provision for significant surface irregularities.

U.S. Pat. No. 6,672,413 B2 by Moore, et al., incorporated herein by specific reference for all purposes, describes a remote controlled inspection vehicle utilizing magnetic adhesion to traverse non-horizontal, non-flat, ferromagnetic surfaces. Although this device employs magnets to adhere to the climbing surface, no magnets are attached to, or guided by, a track. The magnets are, rather, attached directly to the vehicle. The track comprises modules each of which contains a permanent magnet that the endless track surrounds. These modules are so constructed as to pivot about longitudinal axes in an attempt to conform to pipes or other irregularities.

Thus, an invention such as described herein, that distributes the forces required to maintain equilibrium between the vehicle and climbing surface during operation among a plurality of adhering track members, is novel to the state of art and is usefully and directly applicable to climbing vehicles having, or requiring, adhering track members incorporated in endless tracks. The herein taught art comprises a compliant suspension apparatus that distributes stiffness (and correspondingly the forces of equilibrium) relative to the plurality of adhering track members.

SUMMARY OF THE INVENTION

In various embodiments, the present invention comprises a tracked climbing machine having one or more revolving or cyclical gripping devices with adhering track members. The revolving or cyclical gripping device is preferably in the form of one or more closed or endless, tracks, chains, belts, or cables upon the exterior of which the previously mentioned adhering track members are mounted. This tracked vehicle can climb vertical surfaces and overhangs and negotiate surface irregularities and, in doing so, prevent its tracks from losing full surface contact and adhesion.

Its innovations are particularly useful in transiting, ascending and otherwise negotiating unprepared boiler sides, submarine hulls, ships sides, towers and other ferrous structures to perform automated or remotely controlled inspection, maintenance, and cleaning tasks that could not otherwise be accomplished. The device is notably adept at climbing vertical surfaces and overhangs and it is able to negotiate surface irregularities without its tracks losing full surface contact and adhesion. It moves and climbs in a manner employing multiple feet, preferably aligned in two or more columns or tracks by applying, adjusting, and releasing each individually gripping foot in response to whatever surface contour may be encountered by that particular foot.

A significant advance introduced by this technology is the bias devices installed along the compliant beam. These devices exert forces on the beam, in such a way as to distribute the pressure of the track in a uniform manner, even when the transited surface is non-planar. This particularly improves overall track performance when transiting small bumps or hummocks on the surface.

Further objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that, in some instances, various aspects of the invention may be shown exaggerated or enlarged to facilitate an understanding of the invention.

Figure 1:
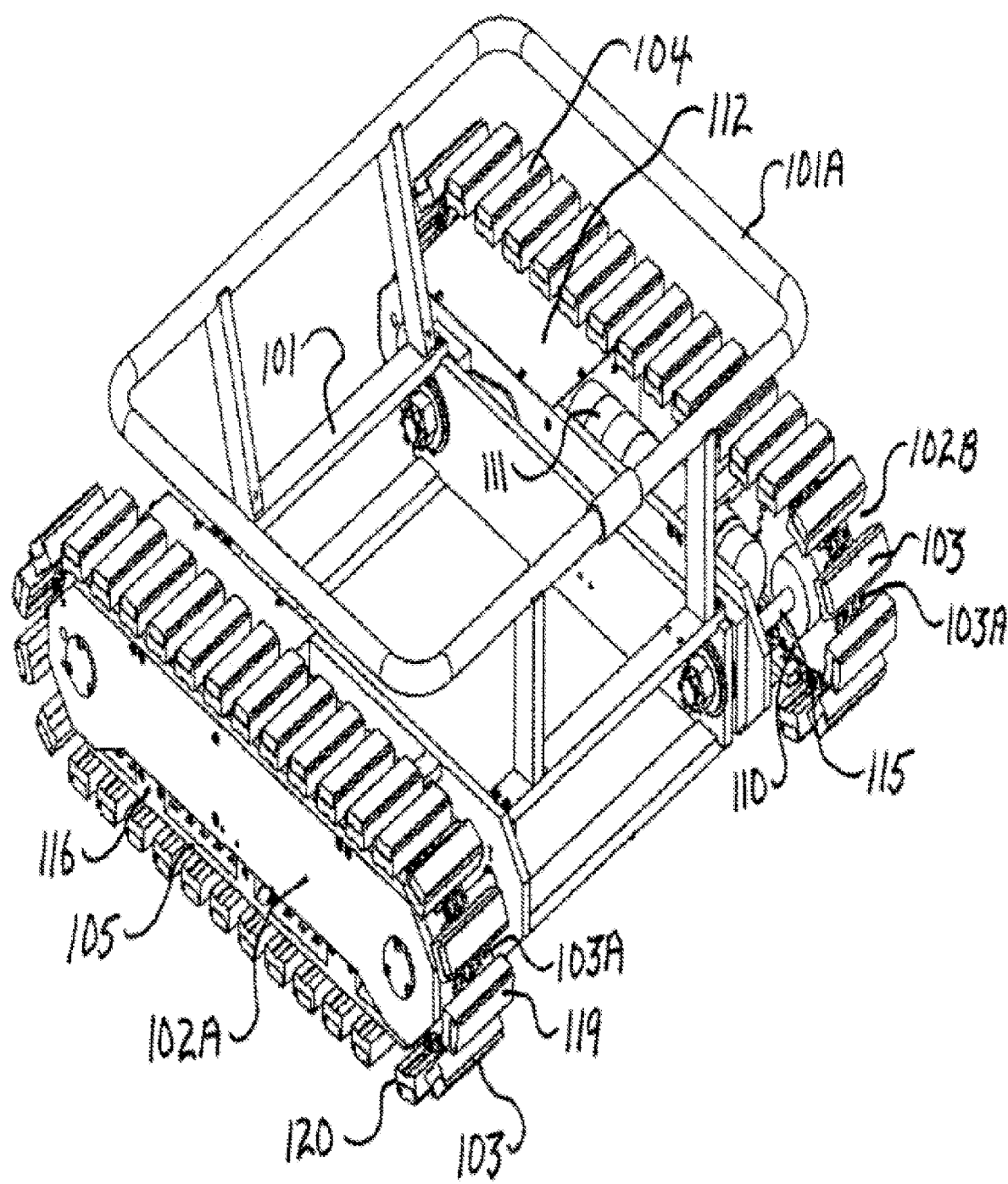
FIG. 1 is an isometric view of the climbing vehicle composed of the vehicle chassis, two track modules, and endless track.

LIST OF NUMBERED ELEMENTS 101 vehicle chassis
101a chassis payload rack
102a port side track module
102b starboard side track module
103 endless track
103a track sliding members
104 adhering track members
105 compliant beam
106 fore tangential guide linkage
107 aft tangential guide linkage
108 contour-following bias device
108a fore contour-following bias device
108b midship's contour-following bias device
108c aft contour-following bias device
109 drive sprocket
110 track sprocket
111 drive motor
112 transmission
113 guide slot
114 drive sprocket axle
115 track sprocket axle
116 compliant suspension apparatus
118 track-tensioning mechanism
119 magnet
120 support block
121a fore bias adjuster
121b mid bias adjuster
121c aft bias adjuster
D1 direction of motion
CS climbing surface
CI contour or irregularity
u1 axis u1 normal to the climbing surface CS
u2 axis u2, in the plane of the climbing surface CS and normal to the axis of the direction of movement endless track
u3 axis along track direction of motion D1
R1 first independent track module axes of limited rotational freedom about an axis in the plane of the climbing surface CS
R2 second independent track module axes of limited rotational freedom about an axis in the plane normal to that of the climbing surface CS

DETAILED DESCRIPTION

Detailed descriptions of exemplary embodiments are provided herein. It is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 2:
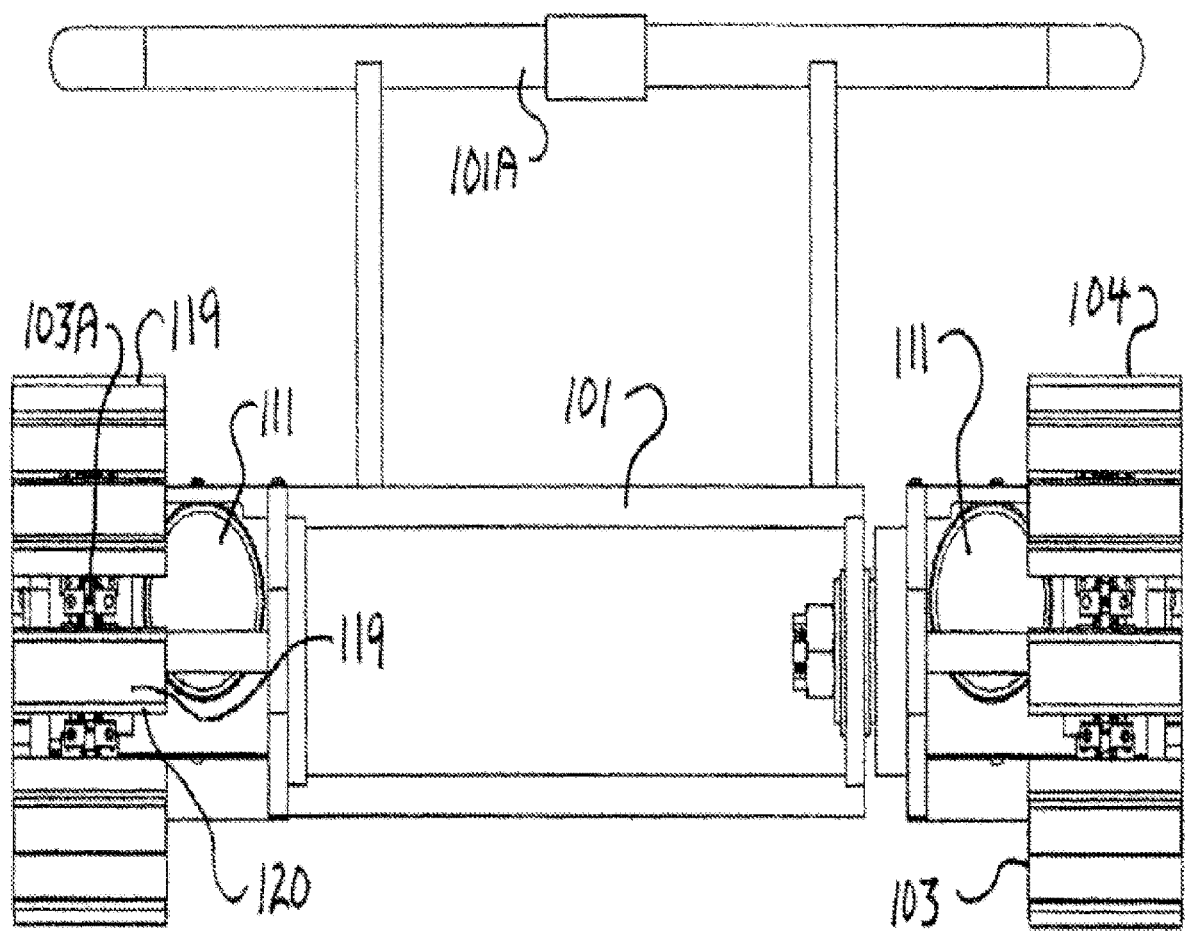
FIG. 2 is a front view of the climbing vehicle showing a front view of the vehicle chassis, track modules, and endless track.

In one exemplary embodiment, as seen in FIGS. 1 and 2, the present invention comprises a self-propelled work vehicle for traversing a surface comprised of a vehicle chassis 101 to which a payload may be attached. The vehicle is equipped with one or more track modules 102a, 102b that support the vehicle chassis 101, and which support endless tracks 103. These tracks 103 incorporate a plurality of magnetic track members 104 spaced along each endless track 103. The chassis 101 may be adapted to carry a multiplicity of payloads, tools or equipment.

As seen in FIGS. 3, 4, 7, 8 and 9, the endless track 103 with track members 104 cyclically moves in such a way as to provide locomotive force. When the vehicle is in motion, portions of the track 103 are constantly cycling through a traction portion of its cycle, wherein they make contact with the climbing surface (CS). As seen in FIGS. 4, 5, 7, 8 and 9, a compliant suspension apparatus 116 incorporates a compliant beam 105 to which the revolving or cyclical track 103 is slidably connected.

In a short summary of the device and its operation, the climbing vehicle and chassis 101 are subject to a variety of forces, including gravitational and dynamic loads associated with the vehicle and payload motion, as well as to forces generated by the operation of the tooling or equipment attached to the vehicle. These forces are to be transferred to the climbing surface (CS) through the endless track 103 and adhering track members 104, preferably permanent magnets 119. The forces are compensated for by the compliant suspension apparatus 116, and bias devices 108, adjusted according to Hooke's law which relates force, displacement and stiffness. This adjustment may be applied automatically or manually.

The compliant suspension apparatus 116 and the compliant beam 105 of this device dictate how the above forces are transmitted from the vehicle chassis 101 to the adhering track members 104 over a wide range of surface irregularities or contours (CI) of the climbing surface (CS). This apparatus, a combination mechanism of a compliant beam 105 slidably connected to the track 103, rigid body members, and bias devices 108 or springs, maximizes track contact with the climbing surface (CS) in a manner different from and superior to previous technologies and permits the flexible endless track 103 to propel and support a rigid vehicle chassis 101 in a more continuous, and therefore more effective manner.

Figure 5:
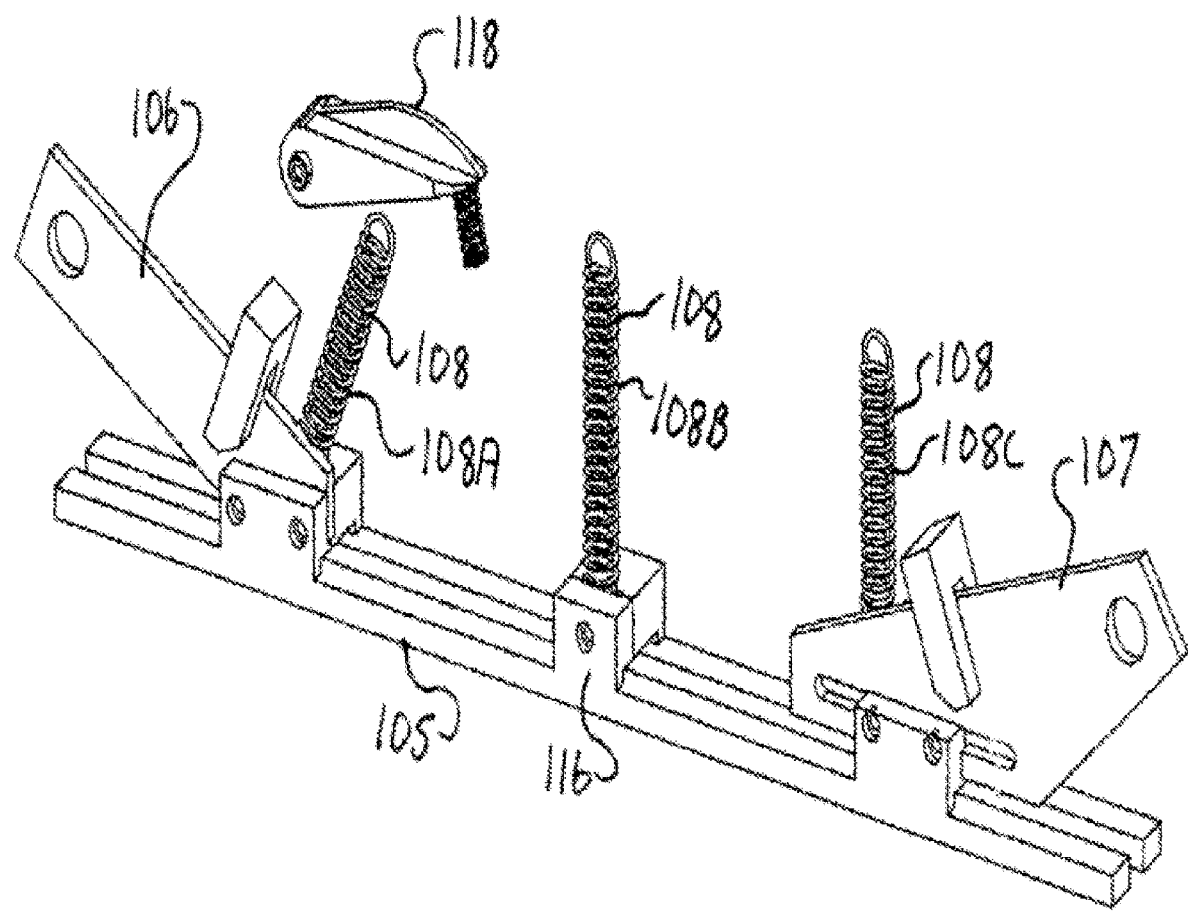
FIG. 5 shows the primary components of the compliant suspension apparatus isolated from the track module.

The apparatus which achieves the above prescribed stiffness or compliance consists of three primary components. These components, in the embodiment shown in FIG. 5, are as follows: the one or more compliant beams 105; the rigid body tangential guide linkages 106, 107; and the contour-following bias devices 108. A compliant beam 105 is slidably attached to the endless track 103. The compliant beam's 105 geometric and material properties are established to be compatible with the geometry of a climbing surface (CS) having a wide range of contours or irregularities (CI).

Figure 10:
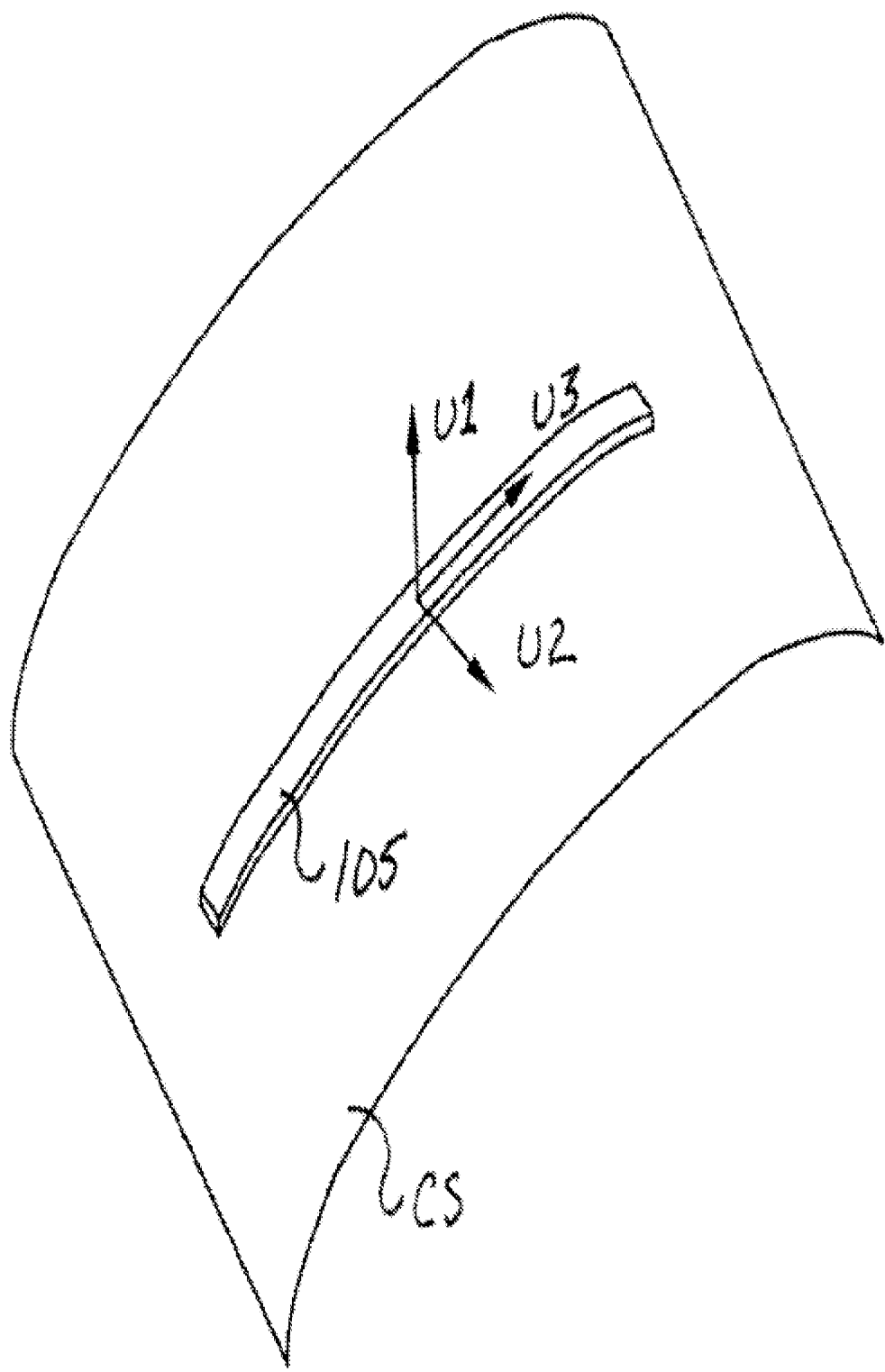
FIG. 10 shows a diagram of the climbing surface (CS) with a compliant beam. A basis set of directions are defined at a point along the compliant beam as: u1, a unit axis normal to the climbing surface (CS); u2, along the axis of the endless track at this point; and u3, the right-hand axis of the frame.

The compliant beam 105 of FIG. 10 is conjugate and slidably connected to the endless track 103 (not shown) and prescribes five specific stiffness (or compliance) components between the climbing surface (CS) and the climbing machine body. These include all axis cardinal directions in three-dimensional space, except the direction of movement D1 of the endless track. Since the compliant apparatus is slidably connected to the endless track 103, no stiffness is prescribed on that axis of the endless track.

Listing the components addressed, they are, as shown in FIG. 10:

1) translational stiffness along unit axis u1 normal to the climbing surface (CS);
2) translational stiffness along unit axis u2, in the plane of the climbing surface (CS) and normal to the axis of the endless track 103;
3) rotational stiffness about u1 normal to the climbing surface (CS);
4) rotational stiffness about u2, an axis in the plane of the climbing surface (CS) and normal to the axis of the endless track 103; and
5) rotational stiffness about u3, the axis of the endless track 103.

The linear stiffness along u1 is prescribed along the entire track 103 to uniformly distribute the forces on the adhering track members 104. The linear stiffness along u2 is prescribed to limit transverse deflection of the endless track 103 (high stiffness). The rotational stiffness about u1 is prescribed to limit rotation of the endless track 103 (high stiffness) about an axis normal to the climbing surface (CS). The rotational stiffness about u2 is prescribed to allow low stiffness along the center portion of the endless track 103 to accommodate contours or irregularities in the climbing surface (CS) and high stiffness where the endless track 103 engages the track sprockets 110.

The rotational stiffness about u3 is prescribed to allow low stiffness along the center portion of the endless track 103 to accommodate contours or irregularities (CI) in the climbing surface (CS), and high stiffness where the endless track 103 engages the track sprockets 110.

As noted above, the compliant beam 105 provides a surface conjugate to the endless track 103 in a slidable connection. The fore tangential guide linkage 106 enforces the stiffness and geometry of the compliant beam 105 conjugate to the endless track 103 at the point where the endless track 103 engages the drive sprocket 109. The aft tangential guide linkage 107 enforces the stiffness and geometry of the compliant beam 105 conjugate to the endless track 103 at the point where the endless track 103 engages the track sprocket 110. The contour-following bias device members 108a, 108b, 108c prescribe the stiffness of the compliant beam 105 in the u1 direction to more uniformly distribute the forces in the adhering track members 104.

Figure 4:
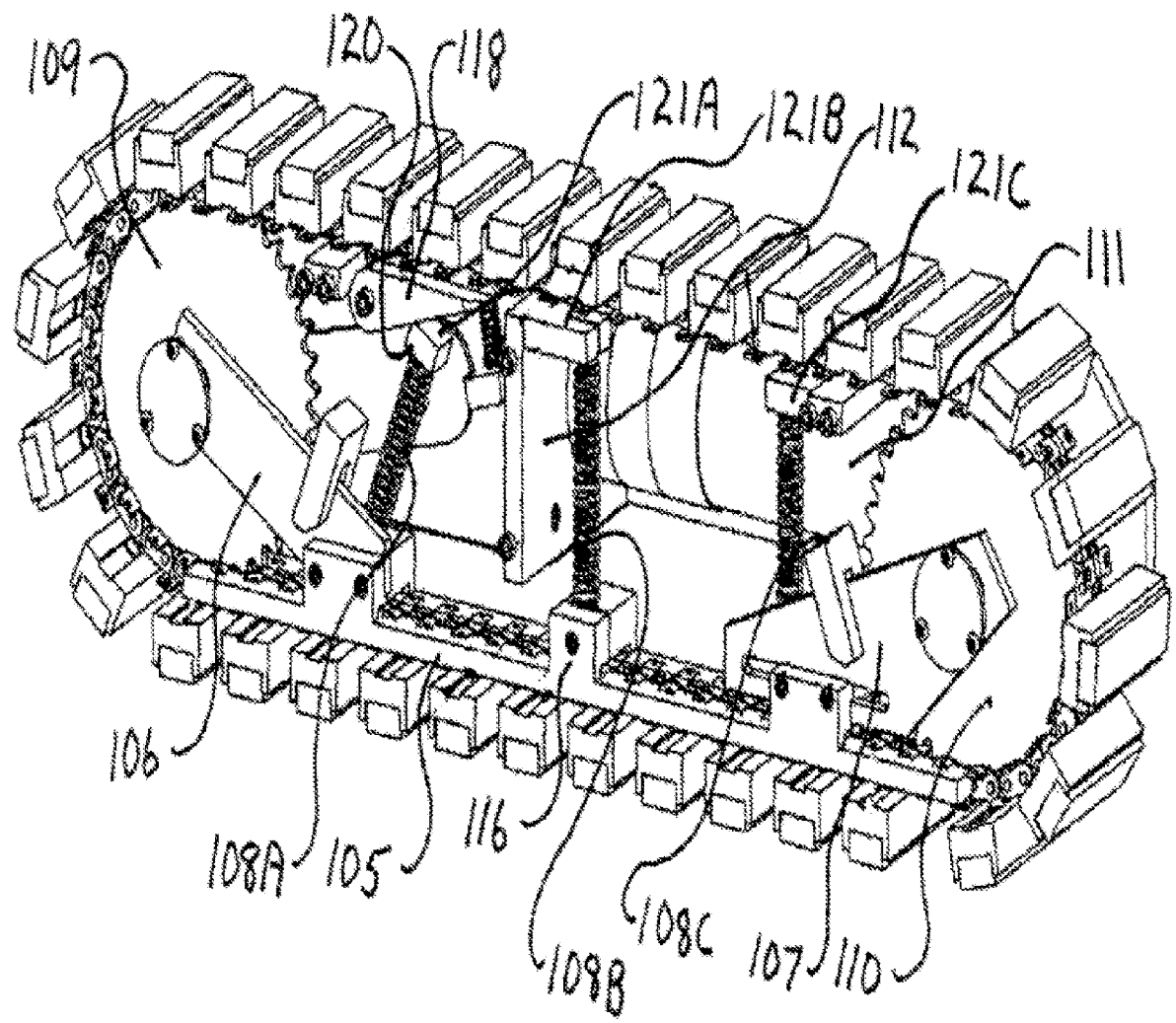
FIG. 4 is an isometric view of a single track module with the exterior cover cut away showing the compliant suspension apparatus consisting of compliant beam, fore tangential guide link, aft tangential guide link, contour-following bias devices, fore, mid and aft bias adjuster and tensioning mechanism. Also shown in FIG. 4 are the track drive components: i.e., drive sprocket, track sprocket, drive motor, and transmission.

This compliant beam 105 is so contrived and adjusted by means of contour-following bias devices 108a, 108b, 108c and adjustors 121a, 121b, 121c (see FIG. 4). These bias devices 108 are located at points along the compliant beam 105 such that each bias device 108 exerts force upon the compliant beam 105 at its particular point on the beam 105. This changes the force of the track 103 against the transited surface (CS) at that particular tension point. The change of force at this point creates a force to pull portions of the track 103 more firmly against the transited surface (CS) by promoting deformation of the compliant beam 105 to conform with the topography of the surface (CS) being transited.

This causes track 103 force against the transited surface (CS), to be more equally distributed, promoting increased surface contact of all adhering track members 104 along the rest of the track 103, thereby maximizing the area over which the adhering track members 104 of the endless track 103 contact the transited surface and distributing the force along the track 103. The benefits of these effects are particularly notable when and where the track 103 encounters small bumps, hummocks or other irregularities (CI) in the climbing surface (CS).

A useful way of understanding this innovation is to imagine this climbing machine, inverted, transiting an overhead surface (CS), essentially clinging magnetically to, and hanging from, the ceiling. In such a position, one can see the benefit of distributing the load along the track 103 through the bias devices 108 and simultaneously ensuring positive pressure between the track 103 and the overhead surface (CS) at each end of the track 103. In the same way, referring to FIG. 7-9, one can see that as the device passes over an irregularity (CI), the portion of track 103 not in contact with the irregularity (CI) would tend to be pushed out of contact with the climbing surface (CS) were it not for the bias devices 108. But because of the tension exerted by the bias device 108 on the track 103 in the vicinity of the irregularity (CI), the rest of the track 103 tends to be pulled more firmly into contact with the climbing surface (CS).

Thus the track 103 and the compliant beam 105, tend to better adapt to contours (CI) of climbing surfaces (CS) in such a way as to allow the magnetically adhering track members 104 to maintain traction on the surface (CS). The system is powered by the drive motor 111 and transmission 112 that propels the track 103 via one or more drive sprockets 109.

Referring to FIG. 2, the chassis 101 is attached to the track modules 102a and 102b in a manner that allows two degrees of rotary movement between each track module 102a, 102b and the chassis 101. As shown in FIG. 1, this movement is about two independent axes R1 being an axis in the plane of the climbing surface (CS), and R2 being an axis normal to the climbing surface (CS).

Figure 3:
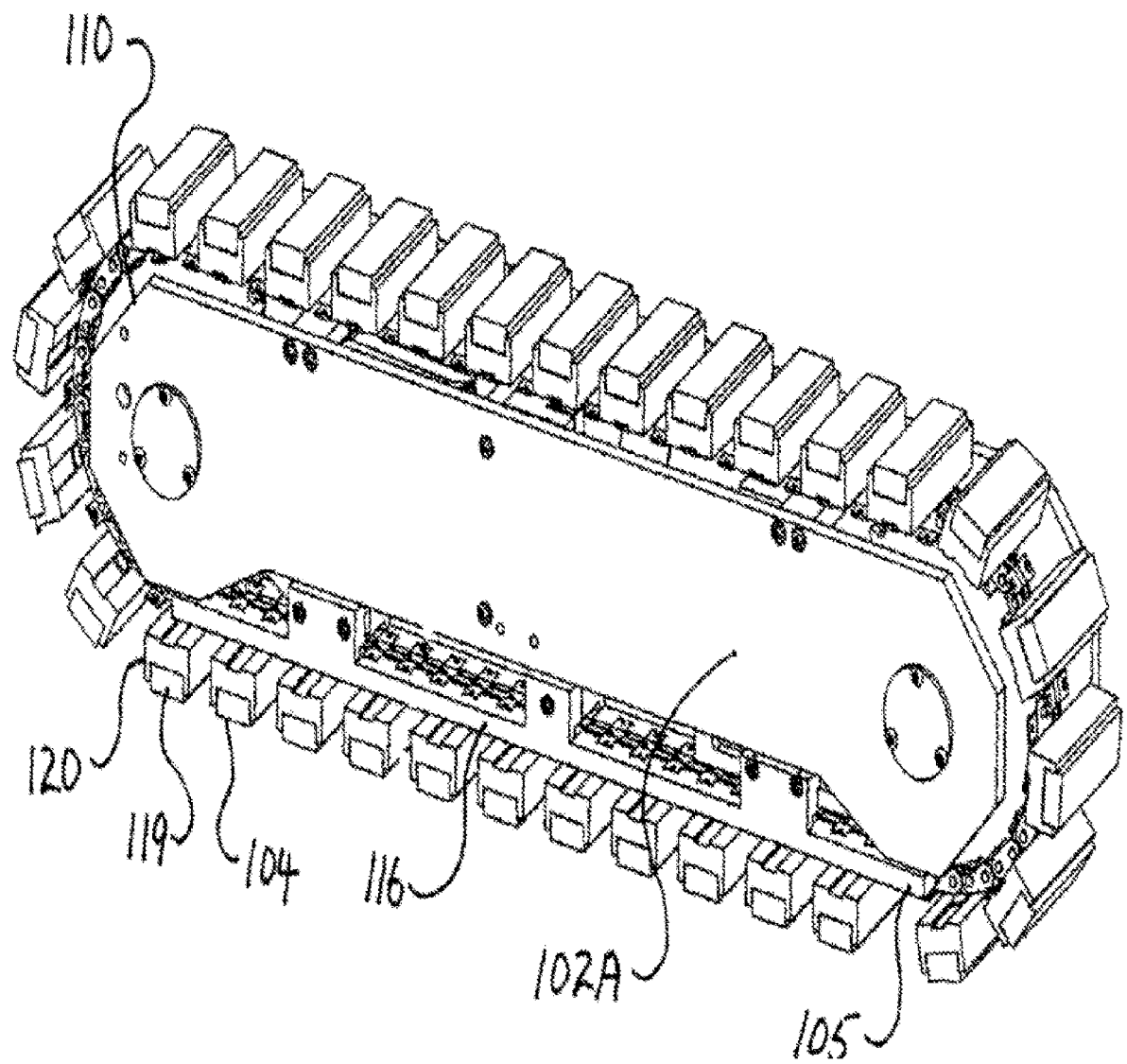
FIG. 3 is an isometric view of a single track module showing the endless track and adhering track members.
Figure 6:
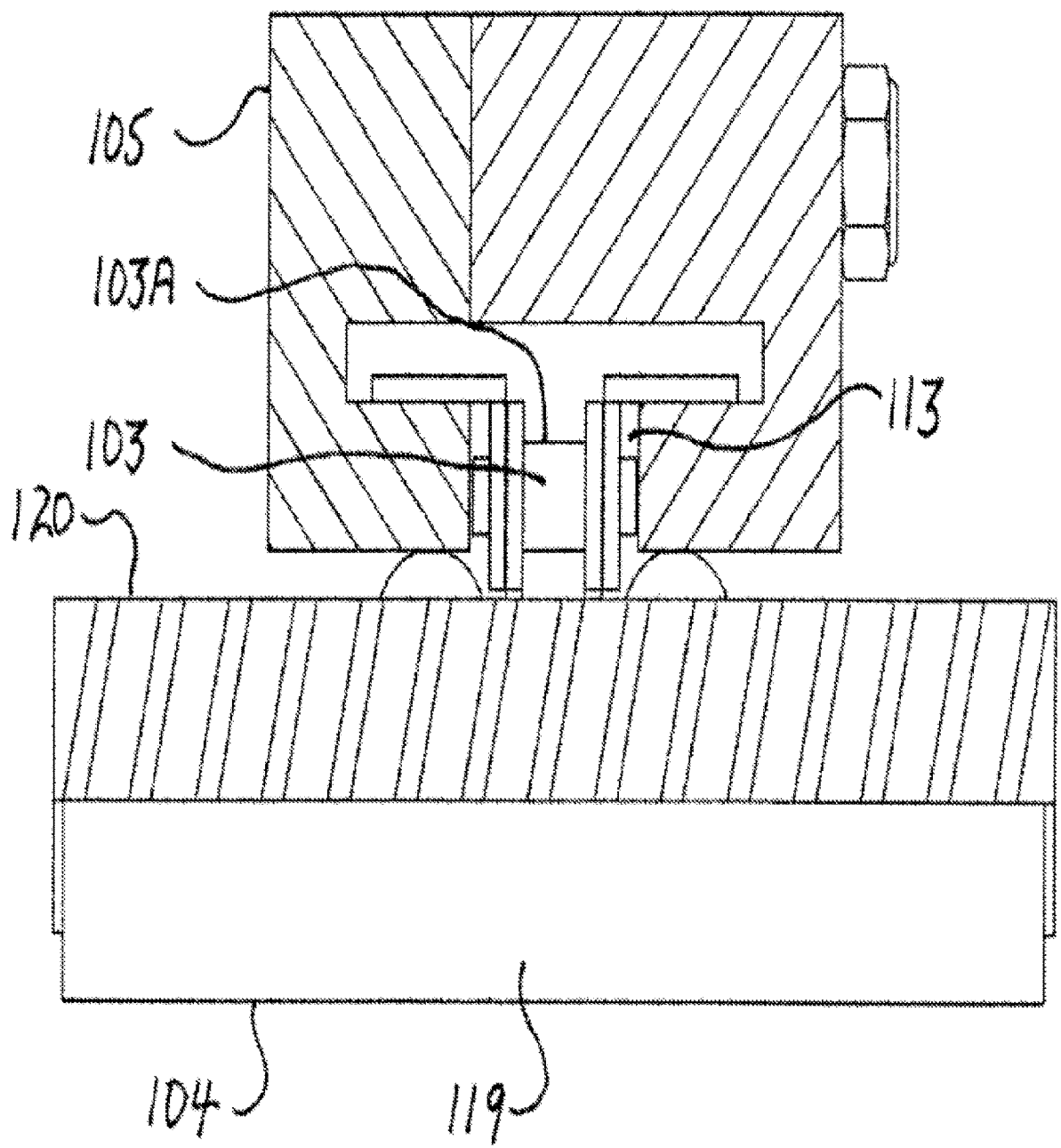
FIG. 6 shows a cross-sectional end view of the slidable connection between the compliant beam, the endless track, and the sliding track member, guided through guide slot and also of the support block, magnetic adhering track member, and the connection between the adhering track member and the endless track.

Referring to FIG. 6, the adhering track members 104 each are preferably comprised of a magnet 119 located in a support block 120. Referring to FIGS. 3 and 4, the support block 120 is connected to respective sections of the endless track 103 and sliding member 103a in the guide slot 113 so that necessary relative motion is available to allow the assembly of endless track 103 and adhering track members 104 to pass along and around the path described by the location of the drive and track sprockets 109 and 110, the track-tensioning mechanism 118, and the guide slots 113 in the compliant beam 105.

Referring to FIGS. 3 and 4, a compliant suspension apparatus 116 is contained within the track modules 102a and 102b. The compliant suspension apparatus 116 consists of compliant beam 105, fore tangential guide linkage 106, aft tangential guide linkage 107, and a plurality of contour-following bias devices 108a, 108b and 108c.

The compliant beam 105 is slidably connected to the endless track 103 through guide slots 113. The fore tangential guide linkage 106 is rigidly attached to the compliant beam 105 and pivotally connected to the track module 102a at the drive sprocket axle 114. The aft tangential guide linkage 107 is slidably connected to the compliant beam 105 and pivotally connected to the track module 102a at the track sprocket axle 115.

The endless track 103 engages the drive sprocket 109 and track sprocket 110. The drive sprocket 109 and track sprocket 110 are pivotally connected at the drive sprocket axle 114 and track sprocket axle 115 respectively to the track module 102a to permit pivotal movement of the drive and track sprockets 109 and 110. The drive sprocket 109 is driven by a drive motor 111 through a transmission 112. Each track module 102a, 102b is independently driven, allowing the vehicle to be propelled and steered by judicious control of speed and direction of the drive motor(s) 111.

The endless track 103 engages the track-tensioning mechanism 118. The track-tensioning mechanism 118 is pivotally connected to the track module 102a and is biased with a track-tension bias device 118 to provide tension in the endless track 103, as the length of endless track 103 in contact with the climbing surface (CS) varies according to the surface irregularities or contours encountered (CI).

The forward external contour-following bias device 108a is pivotally connected to the compliant beam 105 and pivotally connected to the track module 102b. The aft contour-following bias device 108c is pivotally connected to the fore tangential guide linkage 106 pivotally connected to the track module 102b. The aft contour-following bias device 108 is pivotally connected to the aft tangential guide linkage 107 and pivotally connected to the track module 102b as shown in FIG. 4.

In operation, the vehicle chassis 101 is positioned with adhering track members 104 in contact with a climbing surface (CS). Then, the drive motor(s) 111 are activated. Proceeding along the climbing surface (CS), the adhering track members 104 make sequential contact, each in its turn, with the climbing surface (CS), while the endless track 103 slides along the compliant beam 105, thereby propelling the vehicle.

Figure 7:
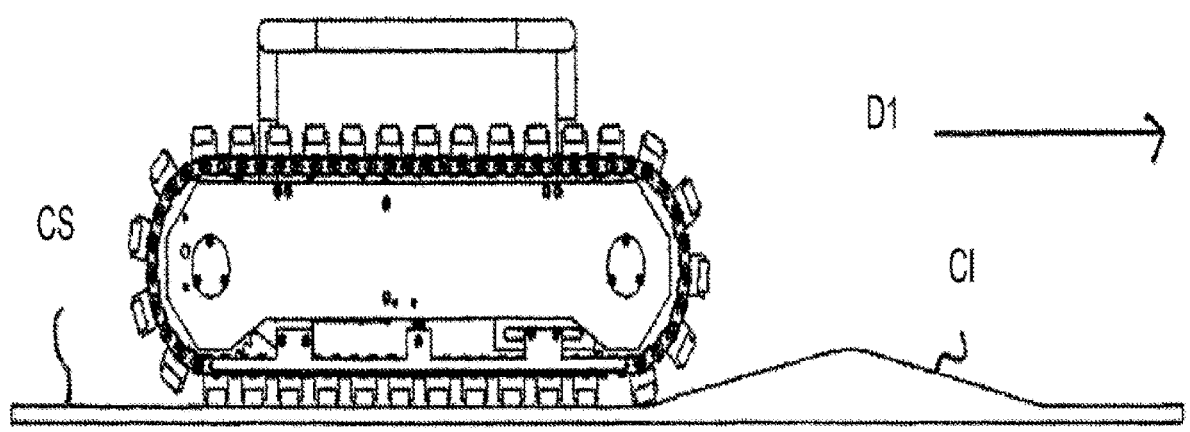
FIGS. 7, 8 and 9 are side views of the device moving in direction D1, encountering an irregularity (CI) in a climbing surface (CS), and also showing operation of the compliant suspension apparatus.
Figure 8:
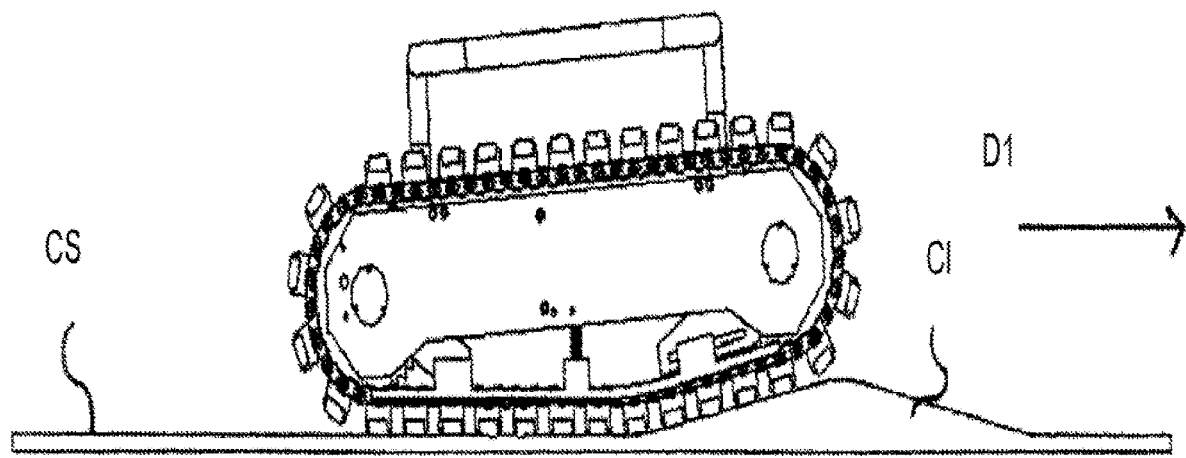
Figure 9:
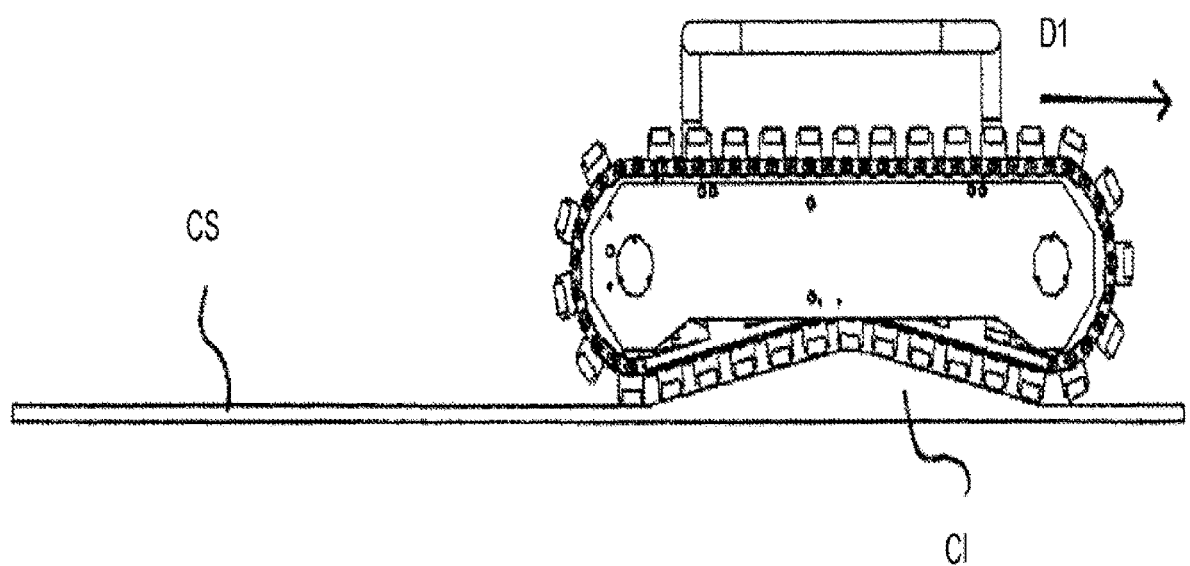

Referring to FIGS. 7-9, when an adhering track member 104 encounters an irregularity (CI) in the climbing surface (CS), the vehicle and suspension system ingeniously compensate for this surface irregularity (CI) with a high level of precision. Here an irregularity (CI) of the climbing surface (CS) is defined as any spatial departure of the climbing surface (CS) from a planar surface. Such surface irregularities may be concave or convex, sharply defined protrusions or rifts, or a combination thereof.

The means of this notably effective compensation are employed as follows. The compliant beam 105 of the suspension deforms to match the contour of the climbing surface irregularity (CI). While deformed, the compliant beam 105 maintains its slidable connection to the endless track 103. The contour-following bias devices 108a and 108b maintain tension or compression between the deformed compliant beam 105 and the rigid vehicle chassis 101 toward the climbing surface (CS). These forces keep the chassis 101 in positive contact with the climbing surface (CS).

This, in turn, forces the fore track sprocket 109 toward the climbing surface (CS). The fore tangential guide linkage 106 then maintains contact of the compliant beam 105 of the suspension and the leading adhering track members 104, guiding the compliant beam 105 to deform to match irregularities in the climbing surface (CS).

To better understand the device in negotiation of a climbing surface (CS), FIG. 7 shows a side view of the device climbing a surface (CS) prior to the surface irregularity (CI), and can be compared to FIG. 8. FIG. 9 shows a similar view of the device on a climbing surface (CS) that has a significant contour or irregularity (CI) to be negotiated. The function of the compliant beam 105 as it adapts to the climbing surface (CS) contours and irregularities (CI) is demonstrated.

Also illustrated are the adaptive functions of the contour-following bias devices 108a, 108b and 108c in supporting the compliant beam 105 while linking the compliant beam 105 to the chassis 101 and the adaptive function of the tangential guide linkages 106 and 107 and of the track-tensioning mechanism 118. Note particularly how the tensioning mechanism 118 adjusts to allow a greater total area of contact for the endless track 103 to conform to brief climbing surface (CS) contours and irregularities (CI).

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A tracked vehicle comprising, a vehicle chassis;
a drive motor;
a track for propelling the tracked vehicle, wherein the track
is propelled by the drive motor, and
includes a plurality of track members adapted to provide traction when the tracked vehicle transits a surface; and
a suspension apparatus, including a compliant beam connected to the track and to the vehicle chassis, wherein the compliant beam deforms to cause the plurality of track members to preserve contact with the surface; and
a bias device located at a point along the compliant beam and adapted to exert a pulling or pushing force on the compliant beam.

2. The tracked vehicle of claim 1, further comprising a track module,
including: the track;
the suspension apparatus; and
a drive sprocket connected to the drive motor and the track, wherein the drive motor propels the track via the drive sprocket.

3. The tracked vehicle of claim 2, wherein:
the track module further comprises a track sprocket connected to the track;
the drive sprocket is disposed at a fore portion of the track; and
the track sprocket is disposed at an aft portion of the track.

4. The tracked vehicle of claim 1, wherein an amount of the pulling or pushing force exerted by the bias device is adjustable.

5. The tracked vehicle of claim 4, wherein the bias device includes a spring.

6. The tracked vehicle of claim 1, further comprising a rack disposed on the vehicle chassis.

7. The tracked vehicle of claim 1, wherein:
at least one track member of the plurality of track members includes a magnet; and
the at least one track member is adapted to provide traction via a magnetic force of the magnet.

8. The tracked vehicle of claim 7, wherein the magnet comprises a permanent magnet.

9. A track module for a tracked vehicle with a chassis, comprising:
- a track for propelling the tracked vehicle, wherein the track includes a plurality of track members adapted to provide traction when the tracked vehicle transits a surface;
- a suspension apparatus, including
  - a compliant beam connected to the track, wherein the compliant beam deforms to cause the plurality of track members to preserve contact with the surface, and
  - a plurality of bias devices located at a plurality of points along the compliant beam and adapted to exert a pulling or pushing force on the compliant beam;
- a drive sprocket disposed at a fore portion of the track and connected to the track, wherein the drive sprocket engages with the track to propel the track; and
- a track sprocket disposed at an aft portion of the track and connected to the track.

10. The track module of claim 9, further comprising a plurality of tangential guide linkages, wherein the plurality of guide linkages link the compliant beam to the chassis.

11. The track module of claim 10, wherein the plurality of guide linkages joins to the compliant beam by pivot points, upon which the plurality of guide linkages is rotatable or slidable.

12. The track module of claim 9, wherein the suspension apparatus further includes a track-tensioning mechanism that provides tension in the track.

13. The track module of claim 12, wherein the track-tensioning mechanism adjusts to allow a larger area of contact between the track and the surface.

14. A tracked vehicle, comprising,
- a vehicle chassis;
- a pair of drive motors disposed on opposite sides of the vehicle chassis;
- a pair of tracks disposed on opposite sides of the vehicle chassis for propelling the tracked vehicle, wherein each track of the pair of tracks
  - is propelled by a drive motor of the pair of drive motors, and
  - includes a plurality of track members adapted to provide traction when the tracked vehicle transits a surface; and
- a pair of suspension apparatuses, where each suspension apparatus of the pair of suspension apparatuses includes a compliant beam connected to a track of the pair of tracks and to the vehicle chassis, wherein the compliant beam deforms to cause the plurality of track members of the pair of tracks to preserve contact with the surface; and
- a bias device located at a point along the compliant beam and adapted to exert a pulling or pushing force on the compliant beam.

15. The tracked vehicle of claim 14, further comprising a pair of track modules, wherein each track module of the pair of track modules includes:
- a first track of the pair of tracks;
- a first suspension apparatus of the pair of suspension apparatuses; and
- a drive sprocket connected to a first drive motor of the pair of drive motors and to the first track, wherein the first drive motor propels the first track via the drive sprocket.

16. The tracked vehicle of claim 14, further comprising a rack disposed on the vehicle chassis.

17. The tracked vehicle of claim 14, wherein:
- at least one track member of the plurality of track members of a track of the pair of tracks includes a magnet; and
- the at least one track member is adapted to provide traction via a magnetic force of the magnet.

18. The tracked vehicle of claim 17, wherein the magnet comprises a permanent magnet.

19. The tracked vehicle of claim 14, wherein each drive motor of the pair of drive motors is independently driven.

* * * * *